United States Patent [19]

Sirkar

[11] Patent Number: 4,750,918
[45] Date of Patent: Jun. 14, 1988

[54] SELECTIVE-PERMEATION GAS-SEPARATION PROCESS AND APPARATUS

[75] Inventor: Kamalesh K. Sirkar, Scotch Plains, N.J.

[73] Assignee: The Trustees of the Stevens Institute of Technology, Hoboken, N.J.

[21] Appl. No.: 738,793

[22] Filed: May 28, 1985

[51] Int. Cl.⁴ ............................................ B01D 53/22
[52] U.S. Cl. ......................................... 55/16; 55/68; 55/158; 55/73; 423/229; 423/244
[58] Field of Search .................... 55/16, 158; 423/226, 423/228, 229, 232, 242, 243

[56] References Cited

U.S. PATENT DOCUMENTS

| | | | |
|---|---|---|---|
| 2,365,457 | 12/1944 | Daniel | 210/8.5 |
| 3,244,763 | 4/1966 | Cahn | 260/677 |
| 3,396,510 | 8/1968 | Ward, III et al. | 55/16 |
| 3,422,008 | 1/1969 | McLain | 55/16 X |
| 3,447,286 | 6/1969 | Dounoucos | 55/16 |
| 3,556,990 | 1/1971 | Gulko | 208/290 |
| 3,676,220 | 7/1972 | Ward, III | 55/158 X |
| 3,719,590 | 3/1973 | Li et al. | 208/308 |
| 3,770,842 | 11/1973 | Steigelmann et al. | 55/16 X |
| 3,799,873 | 3/1974 | Brown | 210/22 |
| 3,800,506 | 4/1974 | Hughes et al. | 55/16 |
| 3,823,529 | 7/1974 | Hughes et al. | 55/16 |
| 3,911,080 | 10/1975 | Mehl et al. | 55/16 X |
| 3,917,526 | 11/1975 | Jennings | 210/23 |
| 3,925,037 | 12/1975 | Ward, III et al. | 55/158 |
| 3,951,789 | 4/1976 | Lee et al. | 210/22 |
| 3,956,112 | 5/1976 | Lee et al. | 210/22 |

(List continued on next page.)

OTHER PUBLICATIONS

Travenol Laboratories, Inc. "5M1430 TMO Total Bypass Membrane Oxygenator–Adult" product brochure (Feb. 1978).
Lee et al., A.I.Ch.E Journal, vol. 24, pp. 860–868 (Sep. 1978).
Kan and Shuler, Biotechnology and Bioengineering, vol. 20, pp. 217–230 (1978).
Webster and Shuler, Biotechnology and Bioengineering, vol. 20, pp. 1541–1556 (1978).
Kimura et al., Recent Developments in Separation Science, (CRC Press, Cleveland, Ohio, 1978).
Travenol Laboratories, Inc. "Travenol TMO Membrane Oxygenator" product brochure (Jan. 1979).
Kimura and Walmet, Separation Science and Technology, vol. 15, pp. 1115–1133 (1980).
Kim, Presentation at AICHE Summer National Meeting, Denver, Col. (Aug. 29, 1983).
Chemical Engineering, Oct. 17, 1983, pp. 14, 17.
Webster, American Biotechnology Laboratory, pp. 29–35 (Dec. 1983).
Chemical and Engineering News, vol. 62, p. 33 (Jun. 25, 1984).
Chemical Week, Jun. 27, 1984, p. 96.

*Primary Examiner*—Robert Spitzer
*Attorney, Agent, or Firm*—Pennie & Edmonds

[57] ABSTRACT

A permeant gas is selectively transferred from a feed-gas mixture which comprises the permeant gas and at least one other component to an output fluid by the process of the invention. The process involves introducing a selective-permeation liquid into a permeation-transfer chamber. A gas-depletion channel and a gas-enrichment channel pass through the permeation chamber and are separated from the chamber respectively by porous walls. The selective-permeation liquid contacts the porous walls but does not flow into the gas-depletion or gas-enrichment channels. The feed-gas mixture is introduced into the gas-depletion channel so that permeant gas in the mixture can pass through the pores of the walls of the channel into the selective-permeation liquid and from the selective-permeation liquid through the pores of the walls of the gas-enrichment channel into the gas-enrichment channel. Permeant gas is withdrawn from the gas-enrichment channel and a stream of gas depleted in the permeant gas is withdrawn from the gas-depletion channel. A gas-transfer unit permits the process of the invention to be carried out effectively.

19 Claims, 2 Drawing Sheets

U.S. PATENT DOCUMENTS

| | | | |
|---|---|---|---|
| 3,957,504 | 5/1976 | Ho et al. | 75/101 |
| 3,980,605 | 9/1976 | Steigelmann et al. | 55/16 X |
| 4,000,065 | 12/1976 | Ladha et al. | 210/23 |
| 4,005,012 | 1/1977 | Wrasidlo | 210/23 |
| 4,014,665 | 3/1977 | Steigelmann | 55/16 |
| 4,015,955 | 4/1977 | Steigelmann et al. | 55/16 |
| 4,062,882 | 12/1977 | Gupta | 260/428.5 |
| 4,106,920 | 8/1978 | Hughes et al. | 55/16 X |
| 4,115,514 | 9/1978 | Ward, III | 55/16 X |
| 4,117,079 | 9/1978 | Bellows | 55/16 X |
| 4,119,408 | 10/1978 | Matson | 55/16 X |
| 4,147,754 | 4/1979 | Ward, III | 55/16 X |
| 4,174,374 | 11/1979 | Matson | 55/16 X |
| 4,187,086 | 2/1980 | Walmet et al. | 55/16 |
| 4,198,293 | 4/1980 | Ogawa et al. | 210/23 |
| 4,214,020 | 7/1980 | Ward et al. | 427/296 |
| 4,220,535 | 9/1980 | Leonard | 210/321 |
| 4,235,983 | 11/1980 | Steigelmann et al. | 55/16 X |
| 4,239,506 | 12/1980 | Steigelmann et al. | 55/16 |
| 4,296,205 | 10/1981 | Verma | 435/240 |
| 4,303,068 | 12/1981 | Zelman | 128/214 |
| 4,306,946 | 12/1981 | Kim | 204/51 |
| 4,326,960 | 4/1982 | Iwahori et al. | 210/650 |
| 4,329,224 | 5/1982 | Kim | 210/709 |
| 4,366,063 | 12/1982 | O'Connor | 210/652 |
| 4,392,960 | 7/1983 | Kraus et al. | 210/651 |
| 4,406,752 | 9/1983 | Weininger et al. | 204/3 |
| 4,418,148 | 11/1983 | Oberhardt | 435/179 |
| 4,420,398 | 12/1983 | Castino | 210/641 |
| 4,443,414 | 4/1984 | Kim | 423/54 |
| 4,445,999 | 5/1984 | Kim et al. | 204/151 |
| 4,455,236 | 6/1984 | Kim | 210/721 |
| 4,516,984 | 5/1985 | Warner et al. | 55/16 |
| 4,554,069 | 11/1985 | Aid et al. | 210/101 |

SELECTIVE-PERMEATION GAS-SEPARATION PROCESS AND APPARATUS

TECHNICAL FIELD

The present invention relates to a process and apparatus for selectively transferring a gas from a feed-gas mixture to an output fluid. As used herein, the term "gas" refers to gases and vapors.

BACKGROUND ART

In chemical technology it is often necessary to remove from a mixture of gases a particular gas or group of gases. It can be particularly difficult to effect such a separation when the gas or gases to be removed constitutes a large fraction of the mixture. One example of such a gas mixture is waste biogas generated by a refuse landfill, which is typically composed principally of methane and carbon dioxide, with from about 30 to about 50 percent of the mixture being carbon dioxide. To convert such a waste biogas to a methane fuel or chemical feedstock, as much of the carbon dioxide should be removed as feasible.

An article by S. Kimura and G. E. Walmet in *Separation Science and Technology*, volume 15, pages 1115–1133 (1980) discloses a technique for purifying biogas mixtures and other gas-separation processes which employs an "immobilized liquid membrane." The immobilized liquid membrane technique employs a flat, porous-membrane assembly. To purify a biogas by the immobilized liquid membrane technique, an aqueous solution of potassium carbonate and cesium carbonate is applied to a flat, porous cellulose membrane to form an immobilized liquid membrane. The cellulose membrane is hydrophilic and defines a feed side of the membrane assembly. The hydrophilic cellulose membrane is supported on a porous polypropylene membrane, which is hydrophobic. The polypropylene membrane is in turn supported by a metal screen, which defines a sweep side of the membrane assembly. A stream of the biogas is passed over the feed side of the assembly and a stream of air is passed over the sweep side of the assembly. Both of the gas streams must be kept properly humidified to prevent the drying out of the liquid membrane on the one hand or the flooding of the membrane on the other.

The permeability of methane through the aqueous immobilized liquid membrane disclosed in the Kimura and Walmet article is relatively low, while that of carbon dioxide is relatively high. The flux of carbon dioxide through the immobilized liquid membrane is facilitated by certain reactions of carbon dioxide with the water and various ionic species in the liquid of the liquid membrane. The transport of carbon dioxide through the membrane due to chemical reactions enhances the normal permeation rate of carbon dioxide through the liquid without any chemical reaction. The following reversible reactions take part in the selective transport of carbon dioxide across the liquid membrane:

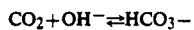

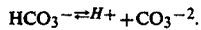

These reactions together with direct solubility effects give rise to a net dissolution of carbon dioxide on the feed side of the membrane assembly where the partial pressure of the carbon dioxide is relatively high and a net regeneration of carbon dioxide on the sweep side of the assembly where the partial pressure of carbon dioxide is relatively low. The flow of air on the sweep side of the membrane assembly maintains a low partial pressure of carbon dioxide on that side, which tends to increase the degree of separation between the methane and carbon dioxide in the biogas.

An article by S. Kimura et al. in *Recent Developments in Separation Science* (CRC Press, Cleveland, Ohio, 1978) discloses that the facilitated permeation rate of carbon dioxide through aqueous carbonate solutions is influenced by the rate of diffusion of ionic species across the liquid membrane, as well as by the rates of the various reactions in the liquid membrane. Thus it is advantageous to minimize the thickness of the membrane to minimize the time it takes for ionic species to diffuse across the membrane. However, conventional porous cellulose films for liquid membrane applications are no thinner than about 46 $\mu$m, since thinner films are too fragile to handle. Porous polysulfone films, which are similarly employed in conventional immobilized liquid membranes, are also no thinner than about 46 $\mu$m. It would be advantageous, however, to achieve higher flux rates than can be achieved with the immobilized liquid membrane technique using conventional porous cellulose and polysulfone films.

The flat geometry of conventional immobilized liquid membrane systems gives rise to additional problems. The membrane surface area per unit equipment volume for flat immobilized liquid-membrane systems is limited, which generally leads to high equipment cost.

Since typically from about 30 to about 50 percent of landfill biogas is carbon dioxide and almost complete removal of the carbon dioxide is desired, large volumes of gas must be brought into contact with the immobilized liquid membrane. Such large volumes of gas make it difficult to maintain an optimum level of humidity on both sides of the membrane and consequently the liquid membrane frequently tends to flood or dry out. Kimura and Walmet in fact concluded that the problems of humidity control could make the operation of an immobilized liquid membrane system difficult, if not impractical.

DISCLOSURE OF THE INVENTION

I have invented a selective-permeation gas transfer process and apparatus which permits a permeant gas to be selectively transferred efficiently from a feed-gas mixture to an output fluid and avoids problems of the prior art noted above.

Broadly, the process of the invention relates to separating a permeant gas from a feed-gas mixture which includes the permeant gas and at least one other gaseous component. The process comprises the step of introducing a selective-permeation liquid into a permeation-transfer chamber. The selective-permeation liquid is selectively permeable to the permeant gas relative to other components of the feed-gas mixture. A gas-depletion channel and a gas-enrichment channel extend through the permeation-transfer chamber. Preferably, the gas-depletion channel is formed by a first multiplicity of porous-wall hollow fibers which extend through the permeation-transfer chamber to define gas-depletion hollow fibers. The gas-enrichment channel is preferably formed by a second multiplicity of porous-wall hollow fibers which extends through the permeation-transfer chamber to define gas-enrichment hollow fibers. The gas-enrichment hollow fibers and the gas-depletion hollow fibers together define gas-transfer hollow fibers. The gas-enrichment channel and the gas-depletion channel together define two gas-transfer channels. (The terms "depletion" and "enrichment" refer respectively to the removal or the addition of the permeant gas. Depending on the application, the permeant gas may be an economically valuable product or may be an undesirable contaminant, as in the case of carbon dioxide in typical landfill biogases.) The gas-depletion channel and the gas-enrichment channel each have a porous wall. The porous walls of the gas-depletion channel and the gas-enrichment channel are located in close proximity to one another in the permeation-transfer chamber. Surfaces of the walls of the gas-transfer channels are preferably composed of a material which tends not to be wetted by the selective-permeation liquid. The walls of the gas-transfer channels are contacted on outer surfaces by the selective-permeation liquid introduced into the permeation-transfer chamber.

The process of the invention further includes the step of introducing a stream of the feed-gas mixture into the gas-depletion channel and allowing the feed-gas mixture to flow through the channel in the permeation-transfer chamber. The permeant gas in the feed-gas mixture passes through pores of the wall of the gas-depletion channel into the selective-permeation liquid in the permeation-transfer chamber and from the selective-permeation liquid through pores of the wall of the gas-enrichment channel into the gas-enrichment channel.

The process further includes the steps of withdrawing a stream of fluid containing the permeant gas from the gas-enrichment channel and withdrawing a stream of gas depleted in the permeant gas from the gas-depletion channel.

The process of the invention can be used to transfer a large number of permeant gases from various gaseous mixtures. The selective-permeation liquid used in the process of the invention will in general be different for different permeant gases and different gaseous mixtures. For example, carbon dioxide can be removed from methane-carbon dioxide mixtures such as a landfill biogas. If the permeant gas is carbon dioxide, the selective-permeation liquid is preferably an aqueous solution of an alkali-metal carbonate. Alternative preferred selective-permeation liquids for carbon dioxide include monoethanolamine, diethanolamine and hindered amines, such amines being used neat or in aqueous solution. Carbon monoxide and carbon dioxide may be removed by the process of the invention from post-shift reaction gas which is generated in the preparation of synthesis gas. A preferred selective-permeation liquid for the removal of carbon monoxide is an aqueous solution of cuprous chloride and an alkali-metal chloride such as potassium chloride. Alternatively, an ammoniacal copper solution in which a fraction of the copper is in the cupric form may be used as a selective-permeation liquid for carbon monoxide. Ethylene and propylene may be separated from ethane and propane using an aqueous solution of silver nitrate or other water-soluble silver salt. Impurity acetylene may be removed from predominantly ethylene gas using the process of the invention Ethanol may be removed from carbon dioxide and water vapor using a non-polar organic liquid having a boiling point substantially higher than the boiling point of ethanol. Xylene and n-decanol are examples of such high-boiling nonpolar liquids. Oxygen may be removed from air with the process of the invention using certain organometallic carriers in an organic solution. Hydrogen sulfide can be removed from refinery process gas using an aqueous solution of an alkali-metal carbonate such as potassium carbonate. Sulfur dioxide may be selectively removed from stack gases using aqueous solutions of an alkali metal bisulfite or sulfite or polar organic compounds such as sulfolane or polyethylene glycol.

In cases in which the selective-permeation liquid is an aqueous solution, the radially outer surfaces of the gas-transfer hollow fibers are preferably hydrophobic. Preferred materials for such hydrophobic fibers include microporous polypropylene, microporous polytetrafluoroethylene, and microporous polyethylene.

An advantage of the process of the invention is that it is not necessary to humidify the sweep gas or the feed gas. Loss of water from an aqueous selective permeation liquid through the pores of the gas-transfer fibers by evaporation can readily be compensated for by introducing water into the permeation-transfer chamber. If the selective-permeation liquid becomes poisoned by a component of the feed-gas mixture or otherwise deteriorates with time, fresh selective-permeation liquid can be continuously introduced into the permeation chamber at an appropriate rate.

When a non-polar selective-permeation liquid is employed, it is generally preferred to make the gas-transfer hollow fiber out of a hydrophilic material. For example, certain ceramic materials can be made into tubular fibers having porous walls which are sufficiently hydrophilic not to be wetted by non-polar liquids. Hydrophilic microporous hollow fibers can also be made of regenerated cellulose or cellulose acetate. Microporous hollow fibers made of regenerated cellulose are used in kidney dialysis machines and are commercially available under the trade name "Cuprophan" from Enka GmbH of the Federal Republic of Germany. Alternately, non-polar selective permeation liquids can be used with hydrophobic hollow fibers if the pressure in the lumina of the fibers is maintained at a sufficiently high value relative to the pressure of the selective-permeation liquid to prevent the liquid from flowing through the pores into the lumina of the fibers. For fibers with small inside diameters it may be difficult to maintain the pressure difference within a suitable range over the entire length of the fibers, because of the pressure drop along the length of the fibers.

The process of the invention has been used to transfer efficiently carbon dioxide from a carbon dioxide-nitrogen mixture to a helium sweep gas in a short transfer cell which employed microporous polypropylene hollow fibers and pure water as the selective-permeation liquid. The feed-gas mixture was composed of about ninety percent nitrogen and about ten percent carbon dioxide. At the enriched gas output, the helium sweep gas included about two percent carbon dioxide and about half a percent nitrogen. Evidently, the carbon dioxide was transferred to the sweep-gas stream substantially more efficiently than the nitrogen, so that highly selective transfer was effected.

BASIC PARAMETERS OF THE INVENTION

Particularly preferred materials for the gas-transfer fibers of the selective permeation cells of the invention are polypropylene, polyethylene and polytetrafluoroethylene.

Preferred polypropylene hollow fibers having porous walls are commercially available under the trade name "Celgard" from Cellanese Fibers Company of Charlotte, N.C. Preferred hollow fibers of polytetrafluoroethylene are commercially available under the trade name "Goretex" from W. A. Gore and Associates of Elton, Md. The outside diameter of the hollow fibers is preferably in the range of from about 50 to about 500 $\mu$m. In general, the smaller the outside diameter of the fibers, the closer the fibers can be packed together and therefore, the more efficiently gas can be transferred from one group of fibers to another. Ordinarily, it is preferred for the gas enrichment and the gas depletion fibers to have substantially the same crosswise dimensions, although for some applications it may be advantageous for the dimensions to differ. The thickness of the walls of the fibers is preferably in the range of from about 6 to about 175 $\mu$m. The effective crosswise dimensions of the pores in the walls of the fibers is preferably in the range of from about 0.002 to about 0.2 $\mu$m. The porosity of the walls of the fibers is preferably in the range of from about 0.05 to about 0.90.

The pressure difference between the gas in the lumina of the gas-depletion hollow fibers and the liquid in the permeation-transfer chamber can vary over a wide range. Similarly, the pressure difference between the gas in the lumina of the gas-enrichment hollow fibers and the liquid in the permeation-transfer chamber can vary over a wide range. It is generally preferred that the difference between the pressure of the gas in the lumina of either set of fibers and the pressure of the selective-permeation liquid not exceed a "bubble point" pressure for the fibers in the liquid. If the pressure of the gas in the lumina of the fibers exceeds the pressure of the selective-permeation liquid by an amount in excess of the bubble-point pressure, the gas will flow through the pores of the walls of the fibers and bubble into the selective-permeation liquid. If the pressure of the selective-permeation liquid exceeds the pressure of the gas in the lumina of the hollow fibers by an amount in excess of the bubble-point pressure, selective-permeation liquid will flow through the pores in the walls of the fibers into the lumina of the fibers. The bubble-point pressure depends upon a number of factors, including the interaction of the selective-permeation liquid with the material of the surface of the fibers and the size of the pores in the walls of the fibers.

It is generally preferred for the pressure in the permeation-transfer chamber to be greater than the pressure of the gas in the lumina of the gas-depletion and gas-enrichment fibers, subject to the condition that the pressure difference not exceed the bubble-point pressure. If the pressure of the liquid of the permeation-transfer chamber exceeds the pressure in the lumina of the hollow fibers, then should a fiber have a pinhole in the wall, liquid would tend to flow into the lumen of the fiber rather then gas escape from the lumen of the fiber. Because gas would not tend to escape through the pinhole, the pinhole would not give rise to a non-selective mixing of the gases in the gas-enrichment and gas-depletion hollow fibers as could occur if gas escaped into the permeation-transfer chamber. The loss of selective-permeation liquid through the pinhole can readily be replaced.

The partial pressure of the permeant gas in the lumina of the gas-depletion fibers is preferably maintained at a higher value than the partial pressure of the gas in the lumina of the gas-enrichment fibers. Such a difference in partial pressure results in a concentration gradient which drives the transport of permeant gas from the gas-depletion fibers to the gas-enrichment fibers. Passing a sweep fluid through the gas-enrichment fibers tends to maintain a low value for the partial pressure of the permeant gas in the gas-enrichment hollow fibers. The sweep fluid may be a gas which physically sweeps the permeant gas from the lumina of the fibers or a liquid which absorbs the permeant gas. Preferably, a sweep liquid does not tend to wet the walls of the gas-enrichment fibers and thus tends to remain confined in the lumina of the fibers. Alternatively, instead of using a sweep fluid a vacuum may be drawn on the gas-enrichment fibers or the permeant gas may be allowed to flow through the lumina of the gas-enrichment fibers under its own pressure. For reasons of economy, air is generally preferred as a sweep fluid when the permeant gas is of no economic value. On the other hand, if the permeant gas is a valuable product, it may be preferable to avoid using a sweep gas in order to avoid diluting the permeant gas.

Preferably, the gas-enrichment hollow fibers and the gas-depletion hollow fibers extend generally parallel to one another. Preferably at least five hundred fibers of each type are used; most preferably at least one hundred thousand fibers of each type are used. When the gas-enrichment and gas-depletion fibers extend parallel to one another, it is preferable for the feed gas in the gas-depletion fibers and the sweep gas in the gas-enrichment fibers to flow in opposite directions in a countercurrent fashion. Such a countercurrent flow tends to maintain a difference in partial pressures of the permeant gas in the lumina of the gas-enrichment and gas-depletion fibers along the entire length of the fibers.

In general, the preferred length of the gas-transfer cell of the invention depends on the concentration of the permeant gas in the feed-gas mixture, the rate at which feed gas mixture is introduced into the cell, the rate and direction sweep gas is passed through the cell, the rate of transfer of permeant gas from the gas-depletion fibers to the gas-enrichment fibers, and the desired degree of separation. For countercurrent flow of feed-gas mixture and sweep gas, the longer the gas-transfer cell, the more complete the separation. Gas-transfer cells from about 0.3 to about 3 m long are generally preferred.

A preferred selective-permeation liquid for carbon dioxide and hydrogen sulfide is an aqueous solution of an alkali metal carbonate. For maximum separation, cesium carbonate is particularly preferred because of its high solubility in water. For reasons of economy, sodium or potassium carbonate may be more preferable than cesium carbonate in some applications. If a potassium carbonate solution is used, the concentration of the potassium carbonate is preferably from about 25 to about 30 weight percent of the solution.

A preferred selective-permeation liquid for carbon dioxide and carbon monoxide is an aqueous solution of cuprous chloride and an alkali-metal chloride. The solution is preferably in the range of from about $1.1 \times 10^{-3}$ to about 0.5 molar in cuprous chloride. For potassium chloride, the solution is preferably about 0.1 to about 4.5 in molar potassium chloride.

A preferred selective-permeation liquid for carbon monoxide is an aqueous solution of copper salts in ammonia. The concentration of copper in the solution is preferably from about 0.1 to about 10 molar. Preferably from about 5 to about 30 weight percent of the copper is in the cupric form.

For separating ethylene or propylene from ethane and propane, an aqueous solution of a water-soluble silver salt is a preferred selective-permeation liquid. Silver nitrate, silver chlorate and silver fluoroborate are suitable water-soluble silver salts. The concentration of silver ion in the solution is preferably in the range from about 0.01 to about 6 molar.

BRIEF DESCRIPTION OF THE DRAWINGS

Preferred processes of the invention are described below with reference to the following figures.

BEST MODE FOR CARRYING OUT THE INVENTION

Figure 1:
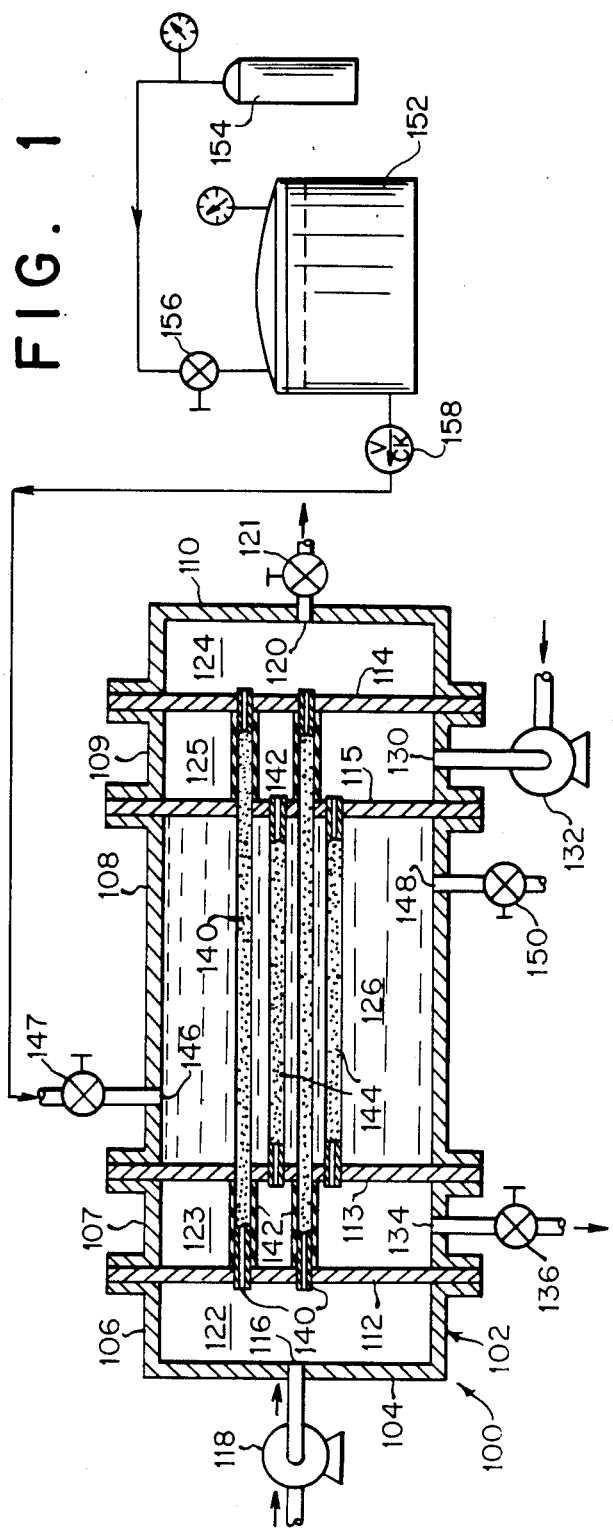
FIG. 1 is a schematic diagram of a first porous membrane gas-transfer unit.

Turning now to FIG. 1, a gas-transfer unit 100 includes a permeation-transfer cell 102. The permeation-transfer cell 102 includes a generally cylindrical pressure vessel 104 which serves as the housing for the cell. The pressure vessel 104 is made up of a feed-gas input section 106, an enriched-gas output section 107, a permeation-transfer section 108, a sweep-gas input section 109, and a depleted-gas output section 110. A feed-gas input partition 112 is located between the feed-gas input section 106 and the enriched-gas output section 107. An enriched-gas output partition 113 is located between the enriched-gas output section 107 and the permeation-transfer section 108. The volume enclosed by the feed-gas input section 106 of the pressure vessel 104 and the input partition 112 defines a feed-gas input manifold 122. The volume enclosed by the enriched-gas output section 107, the feed-gas input partition 112 and the enriched-gas output partition 113 defines an enriched-gas output manifold 123. A sweep-gas input partition 115 is located between the permeation-transfer section 108 and the sweep-gas input section 109 and a depleted-gas output partition 114 is located between the sweep-gas input section 109 and the depleted-gas output section 110. The volume enclosed by the sweep-gas input section 109, the sweep-gas input partition 115 and the depleted-gas output partition 114 defines a sweep-gas input manifold 125. The volume enclosed by the depleted-gas output section 110 and the depleted-gas output partition 114 defines a depleted-gas output manifold 124. The volume enclosed by the permeation-transfer section 108 of the pressure vessel 104, the sweep-gas input partition 115 and the enriched-gas output partition 113 defines a permeation-transfer chamber 126.

The feed-gas input section 106 of the pressure vessel 104 has a feed-gas input port 116 which is connected to a feed-gas input compressor 118 for pumping a feed-gas mixture containing a permeant gas into the feed-gas input manifold 122 under pressure. The depleted-gas output section 110 has a depleted-gas output port 120 to which a depleted-gas discharge throttle valve 121 is connected through which gas depleted in the permeant gas in the depleted-gas output manifold 124 can be discharged. The sweep-gas input section 109 of the pressure vessel 104 has a sweep-gas input port 130 which is connected to a sweep-gas input compressor 132 for pumping a sweep gas into the sweep-gas input manifold 125 under pressure. The enriched-gas output section 107 has an enriched-gas output port 134 to which an enriched-gas discharge throttle valve 136 is connected through which sweep-gas enriched in the permeant gas from the enriched-gas output manifold 123 can be discharged.

The permeation-transfer section 108 of the pressure vessel 104 has a permeation-liquid inlet port 146 connected to a permeation-liquid inlet valve 147 for introducing a selective permeation liquid into the permeation-transfer chamber 126. A permeation-liquid outlet port 148 connected to a permeation-liquid outlet valve 150 is provided in the solute-transfer section 108 for discharging permeation liquid from the permeation-transfer chamber 126.

A plurality of hollow gas-depletion fibers 140 extend from the feed-gas input manifold 122 to the depleted-gas output manifold 124. Although for simplicity only two such fibers are shown in FIG. 1, preferably hundreds of thousands of gas-depletion fibers 140 are used. The gas-depletion fibers 140 pass through, in turn, the feed-gas input partition 112, the enriched-gas output manifold 123, the enriched-gas output partition 113, the permeation-transfer chamber 126, the sweep-gas input partition 115, the sweep-gas input manifold 125, and the depleted-gas output partition 124. Thus the lumina of the gas-depletion fibers 140 provide communication from the feed-gas input manifold 122 to the depleted-gas output manifold 124. Non-porous sheaths 142 surround each gas-depletion fiber 140 in the sweep-gas input manifold 125 and in the enriched-gas output manifold 123 to prevent the gases in the two manifolds from mixing directly with the gases in the lumina of the gas-depletion fibers 140. The gas-depletion fibers 140 are embedded in the four partitions 112, 113, 114 and 115 in an essentially fluid-tight manner. The hollow gas-depletion fibers 140 have a wall thickness of about 25$\mu$m and an inside diameter of about 100 $\mu$m. The gas-depletion fibers 140 have walls made of porous polypropylene. The pore size of the pores in the walls of the fibers is roughly 0.036 $\mu$m and the porosity of the walls is about 0.2. The hollow fibers are available commercially under the trade name "Celgard type X10 MHF" polypropylene fibers from Celanese Fibers Company of Charlotte, N.C.

Figure 2:
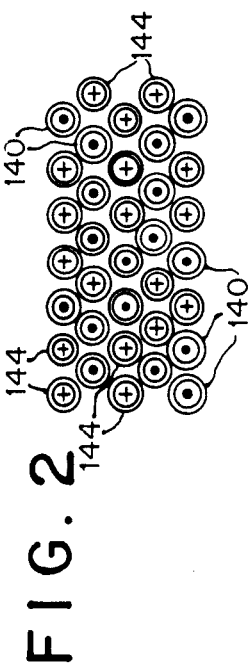
FIG. 2 is a schematic diagram of a crosssectional view of an interior region of a permeation-transfer chamber of the gas-transfer unit of FIG. 1.

A plurality of hollow gas-enrichment fibers 144 extend from the sweep-gas input manifold 125 to the enriched gas output manifold 123. The number of gas-enrichment fibers 144 essentially equals the number of gas-depletion fibers 140. The gas-enrichment fibers 144 are of the same size and type as the hollow gas-depletion fibers 140 described above. The hollow gas-enrichment fibers 144 pass through, in turn, the sweep-gas input partition 115, the permeation-transfer chamber 126 and the enriched-gas output partition 113. The lumina of the gas-enrichment fibers 144 provide communication from the sweep-gas input manifold 125 to the enriched-gas output manifold 123. The gas-enrichment fibers 144 are embedded in the sweep-gas input partition 115 and the enriched-gas output partition 113 in a fluid-tight manner. The gas-enrichment fibers 144 commingle with the gas-depletion fibers 140 in the permeation-transfer chamber 26, as may be seen in FIG. 2. In FIG. 2, a "dot" in the center of a lumen of a hollow fiber indicates gas flow in the lumen in the direction out of the plane of the drawing and a "plus sign" in the center of a lumen indicates gas flow in the lumen in the direction into the plane of the drawing. The gas-enrichment fibers 144 and the gas-depletion fibers 140 are located close to one another to minimize the thickness of the selective-permeation liquid which the permeant gas must traverse in passing from the one set of fibers to the other.

Commingled bundles of the gas-depletion fibers 140 and the gas-enrichment fibers 144 embedded in the four partitions 112, 113, 114 and 115 can be prepared as follows. First, the desired number of sections of the hollow tubular polypropylene fiber are cut to substantially the same length to serve as the gas-depletion fibers 140. Short lengths of the fibers at opposing ends are coated with a cellulose acetate solution. The cellulose acetate is allowed to dry to form the non-porous sheaths 142 at the ends of the gas-depletion fibers 140. The coated ends of the fibers are then trimmed to reopen any fibers which were sealed by the cellulose acetate. The lengths of fibers are then laid side-by-side on a flat surface. By weaving thread crosswise of the hollow tubular fibers in strips at either end, the fibers are bound together to form a flat mat. A similar mat is prepared with the same number of sections of hollow tubular propylene fibers cut to a shorter length suitable for the gas-enrichment fibers 144. The mat of the fibers for the gas-enrichment fibers 144 is placed on top of the mat for the gas-depletion fibers 144, with the fibers of each mat running essentially in parallel and with the shorter mat centered lengthwise on the longer mat. The two mats are then rolled up to form a cylinder with the fibers running generally parallel to the cylinder axis. A container of molten gelatin is prepared. The cylinder of fibers is oriented vertically and the lower end of the cylinder up to just above the ends of the shorter fibers is immersed in the molten gelatin. The gelatin is then allowed to cool and solidify. A layer of liquid polyurethane is then cast on top of the solidified gelatin and allowed to cure to form the sweep-gas input partition 115. After the polyurethane partition is cured, the fiber cylinder is warmed to melt the gelatin and allow it to run from the fiber cylinder. The fibers of the cylinder are then washed free of gelatin. The cylinder of fibers is then again oriented in a vertical direction and the lower end of the cylinder is immersed in molten gelatin to just above the ends of the longer fibers. The gelatin is allowed to cool and a layer of liquid polyurethane is cast upon the gelatin and allowed to cure to form the depleted-gas output partition 114. The fiber cylinder is then again cleaned of gelatin by warming and washing. This polyurethane casting process is repeated for the opposite end of the fiber cylinder to form the enriched-gas output partition 113 and the feed-gas input partition 112.

A permeation-liquid supply tank 152 is connected to the permeation-liquid input valve 147 across a check valve 158. The pressure of the liquid in the permeation-transfer chamber 126 is regulated by regulating the pressure in the permeation-liquid supply tank 152. For this purpose, a pressurized tank 154 of feed-gas mixture is connected to the permeation-liquid supply tank 152 across a pressure-regulating valve 156.

In operation, the feed-gas input compressor 118 pumps a feed-gas mixture such as a landfill biogas which includes a permeant gas such as carbon dioxide at a substantially constant rate into the feed-gas manifold 122. The feed-gas mixture flows into the lumina of the gas-enrichment hollow fibers 140, through the enriched gas output manifold 123, through the permeation transfer chamber 126, through the sweep-gas input manifold 125, and into the depleted-gas output manifold 124. The gas in the depleted-gas output manifold 124 is discharged through the depleted-gas output throttle valve 121. A sweep-gas such as air is pumped by the sweep-gas input compressor 132 at a substantially constant rate into the sweep-gas input manifold 125. The sweep-gas flows into the lumina of the gas-enrichment hollow fibers 144, through the permeation-transfer chamber 126 and into the enriched-gas output manifold 123. Thus, the gas in the gas-enrichment hollow fibers 144 flows in a countercurrent direction relative to the gas in the gas-depletion hollow fibers 140. The gas in the enriched-gas output manifold 123 is discharged through the enriched-gas output throttle valve 136.

The permeation-transfer chamber 126 is filled with a selective-permeation liquid which is selectively permeable with respect to the permeant gas in the feed-gas mixture. The pressure in the permeation-transfer chamber 126 is maintained at a value relative to the pressure in the lumina of the gas-enrichment fibers 144 and the pressure in the gas-depletion fibers 140 which prevents the selective-permeation liquid from flowing through the pores in the walls of the fibers into the lumina of the fibers. Water is introduced into the permeation-transfer chamber 126 from the permeation-liquid supply tank 152 to make up for water which is lost by evaporation through the porous walls of the gas-enrichment and gas-depletion hollow fibers 144 and 140. The permeant gas in the feed-gas mixture passes through the pores of the walls of the gas-depletion hollow fibers 140 and into the selective-permeation liquid in the permeation-transfer chamber 126. The gas migrates through the selective-permeation liquid - possibly in a chemically-transformed form - and passes through the pores of the walls of the gas-enrichment hollow fibers 144. A sweep gas flowing through the lumina of the gas-enrichment hollow fibers 144 sweeps the permeant gas from the fibers. Thus the feed-gas mixture as it flows through the permeation-transfer chamber 126 in the gas-depletion fibers 140 becomes depleted in the permeant gas and, conversely, the sweep gas, as it flows through the gas-enrichment fibers 144 in the countercurrent direction, becomes enriched in the permeant gas.

Although the processes and technique described above use an aqueous solution, it is equally applicable if an organic solution that does not wet the hydrophobic organic fibers is chosen. Such organic solutions are likely to be highly polar in nature.

Figure 3:
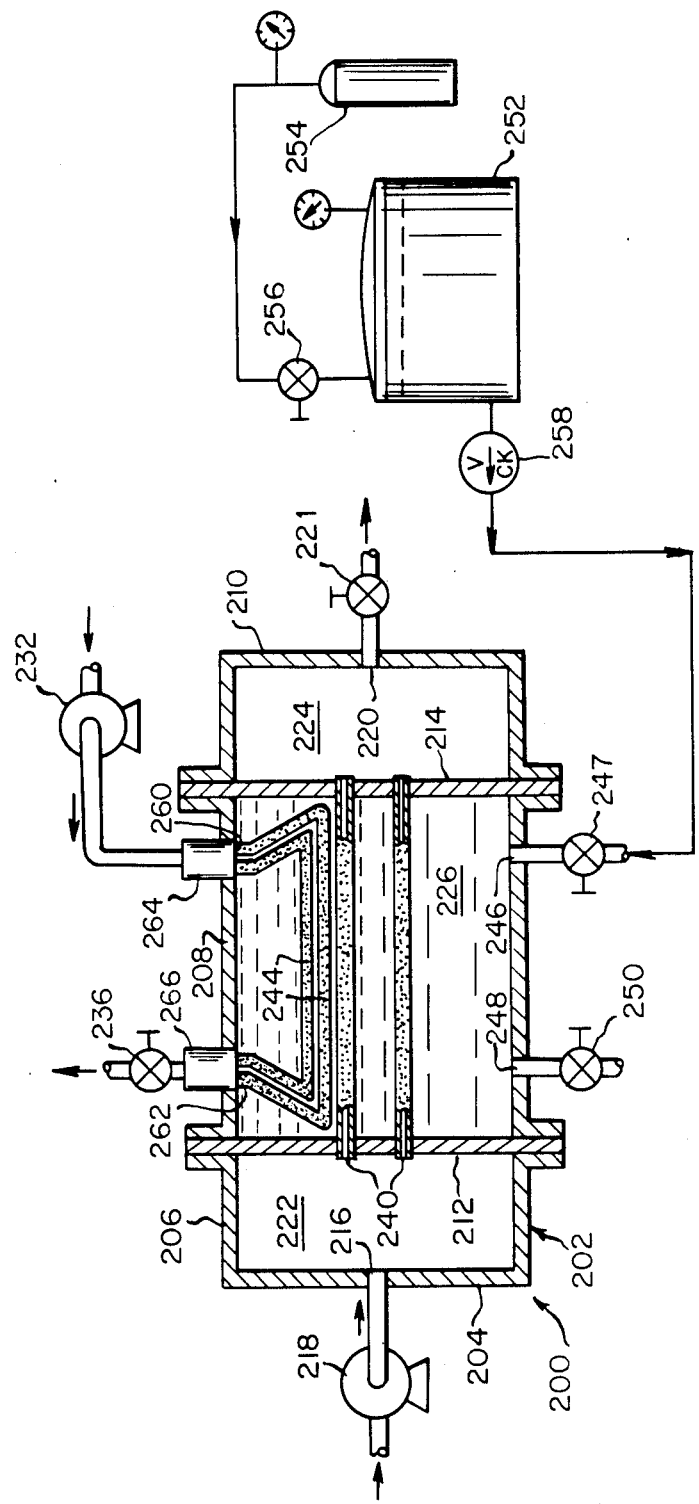
FIG. 3 is a schematic diagram of a second porous membrane gas-transfer unit.

FIG. 3 illustrates a second gas-transfer unit 200 which is generally similar to the first gas-transfer unit 100 described above in connection with FIG. 1. For conciseness, only those features of the second gas-transfer unit 200 which differ from the first gas-transfer unit 100 will be discussed below. Corresponding parts in the first and second gas-transfer units 100 and 200 are given reference numerals which differ by 100. The gas-transfer unit 200 of FIG. 3 is generally simpler to construct than the gas-transfer unit 100 of FIG. 1 and is therefore preferred for most applications.

The gas-transfer unit 200 includes a permeation-transfer cell 202. The permeation-transfer cell 202 includes a generally cylindrical pressure vessel 204 which serves as a housing for the cell. The pressure vessel 204 is made up of a feed-gas input section 206, a permeation-transfer section 208 and a depleted gas output section 210. A feed-gas input partition 212 is located between the feed-gas input section 206 and the permeation-transfer section 208. The volume enclosed by the feed-gas input section 206 and the feed-gas input partition 212 defines a feed-gas input manifold 222. A depleted gas output partition 214 is located between the permeation transfer section 208 and the depleted-gas output section 210. The volume enclosed by the depleted-gas output section 210 and the depleted-gas output partition 214 defines a depleted-gas output manifold 224. The volume enclosed by the permeation-transfer section 208 of the pressure vessel 204, the feed-gas input partition 212, and the depleted-gas output partition 214 defines a permeation-transfer chamber 226.

A plurality of hollow gas-depletion fibers 240 extend from the feed-gas input manifold 222 to the depleted-gas output manifold 224. The lumina of the gas-depletion fibers 240 provide communication from the feed-gas input manifold 222 to the depleted gas output manifold 224. The gas-depletion fibers 240 are made of the porous wall polypropylene material identified above in connection with the gas-depletion fibers 140 of FIG. 1. The permeation-transfer section 208 of the pressure vessel 204 has a sweep-gas inlet port 260 and an enriched-gas outlet port 262 passing through it. Connected to the sweep-gas inlet port is a sweep-gas input manifold housing 264, the interior of which defines a sweep-gas input manifold (not shown). Connected to the enriched-gas outlet port 262 is an enriched-gas outlet manifold housing 266, the interior of which defines an enriched gas outlet manifold (not shown).

A plurality of gas-enrichment hollow fibers 244 extend from the sweep-gas input manifold to the enriched-gas outlet manifold. The gas-enrichement fibers 244 are made of the same porous-wall polypropylene fiber as the gas depletion fibers 240. The gas-enrichment fibers 244 extend through the permeation transfer chamber 226 and commingle with the gas-depletion fibers 240. Although only two each of the gas-depletion and gas-enrichment fibers are shown in FIG. 3 for simplicity, hundreds of thousands of fibers of each type are ordinarily used.

Commingled bundles of gas-enrichment hollow fibers 244 and gas-depletion hollow fibers 240 can be prepared as follows. First, the desired number of sections of the hollow fibers are cut to substantially the same length to serve as the gas-depletion fibers 240. The lengths of the fibers are first placed side by side on a flat surface and then bound together to form a flat mat by weaving thread crosswise of the fibers in strips at either end. A similar mat is prepared with approximately the same number of sections of the fibers of a length suitable for the gas-enrichment fibers 244. For the gas-transfer unit of FIG. 3, the gas-enrichment fibers 244 are longer than the gas-depletion fibers 240. The mat of fibers for the gas-depletion fibers 240 is placed on top of the mat for the gas-enrichment fibers 244 with the fibers of each mat running essentially parallel and with the shorter mat centered lengthwise on the longer mat. The two mats are then rolled up to form a cylinder with the fibers running parallel to the cylindrical axis. The cylinder of fibers is then placed in the permeation-transfer section 208 of the pressure vessel 204. The woven strips of the shorter mat are then unravelled to free the ends of the shorter fibers. The ends of the longer fibers, which protrude from either end of the cylinder, are gathered into one or two bundles and brought out through the corresponding sweep-gas input manifold or enriched-gas output manifold. The four groups of ends of fibers are then potted separately in polyurethane. Specifically, the ends of the fibers of each group in turn are immersed in a layer of liquid polyurethane which is then allowed to harden and cure. The polyurethane blocks the openings of most of the hollow fibers. In order to reopen the openings in the fibers, a slice is cut from the polyurethane. Depending on the nature of the fibers and the polyurethane, the slice may be cut from the polyurethane after it has fully cured or when it has only partially cured. The cured polyurethane serves as the feed-gas input partition 212, the depleted-gas output partition 214 and corresponding partitions (not shown) for the sweep-gas inlet and enriched-gas outlet ports 260 and 262.

EXAMPLES

EXAMPLE 1

A gas-transfer cell generally of the configuration illustrated in FIG. 3 was made from an acrylic thick-walled plastic pipe having an internal diameter of about 57 mm and a length of about 25 cm. The gas-transfer fibers of the cell were made from hollow fibers of microporous polypropylene. The fibers had an internal diameter of about 240 $\mu$m and wall thickness of about 18.5 $\mu$m. The outside diameter of the fibers was therefore about 277 $\mu$m. About 250 fibers were used for the gas-depletion fibers and about 250 fibers were used for the gas-enrichment fibers. The bundle of fibers was tied at very close intervals by soft cotton threads so that the gas depletion fibers and the gas-enrichment fibers would be closely situated to one another. The ends of the fibers were potted with polyurethane resin. The permeation-transfer chamber of the gas-transfer cell was filled with water at a pressure slightly above atmospheric pressure. Water essentially contacted the outside surfaces of all of the gas-transfer fibers in the cell. Pure helium gas at essentially atmospheric pressure and about 25° C. was passed through the lumina of the gas-enrichment fibers at about 92 $cm^3$/min. Pure nitrogen gas at essentially atmospheric pressure was passed through the lumina of the gas-depletion fibers at about 110 $cm^3$/min in a countercurrent direction relative to the flow of helium.

As the two gases flowed countercurrent to each other, nitrogen permeated through the water to the helium stream and vice versa. The helium stream at the outlet of the gas-enrichment fibers was analyzed with a Varian 1420 gas chromatograph for nitrogen. The helium was found to contain about 0.6 volume percent nitrogen. Using the permeability coefficient of nitrogen in water at 25° C. and the dimensions of the gas-transfer fibers in the cell, the average thickness of the water membrane is estimated to be about 0.017 cm in the gas-transfer cell.

EXAMPLE 2

The experiment of Example 1 was repeated with the exception that a mixture of about 10 percent carbon dioxide and about 90 percent nitrogen was substituted for the nitrogen stream of Example 1. The carbon dioxide-nitrogen mixture was introduced into the lumina of the gas-depletion fibers at around 110 standard $cm^3$/min. As in Example 1, pure helium was introduced into the lumina of the gas-enrichment fibers of the cell. The stream at the outlet of the gas-enrichment fibers was analyzed with a Varian 1420 gas chomatograph for nitrogen and carbon dioxide content. The volume percent nitrogen was found to be about 0.57 while that for carbon dioxide was found to be about 2.0. Since the permeability coefficient of carbon dioxide through water is about 30 times larger than that of nitrogen and the partial pressure of carbon dioxide was only about 9 times lower than that of nitrogen, the concentration of carbon dioxide in the stream withdrawn from the gas enrichment fibers was substantially higher than that of nitrogen.

It is not intended to limit the present invention to the specific embodiments disclosed above. The sweep gas and the feed-gas mixture may be pumped through the gas-transfer cell in a cocurrent direction, if desired. The gas-transfer fibers used in a gas-transfer cell of the invention may be composite structures. For example, such composite fibers could have a radially-outer hydrophilic layer and a radially-inner hydrophobic layer, or vica versa, if desired. The partitions 112, 113, 115, and 114 of FIG. 1 could be cast of epoxy or other casting material, if desired. The feed-gas input manifold 222 of the gas-transfer unit 200 of FIG. 3 could be divided by a partition into two separate submanifolds. The gas-depletion fibers 240 could be terminated in one of the submanifolds and the gas-enrichment fibers 244 could be terminated in the other submanifold. Similarly, the depleted-gas output manifold 224 could be divided into two submanifolds by a partition, with the gas-depletion fibers 240 terminated in one submanifold and the gas-enrichment fibers 244 terminated in the other submanifold. Pressurized nitrogen or other pressurized gas can be used to regulate the pressure in the permeation liquid supply tank 152. The gas-depletion channel, permeation-transfer chamber and gas-enrichment channel can be formed from a layered structure consisting of: (1) a first sheet of an impervious backing material, (2) a first sheet of an open-net spacer material, (3) a first sheet of a porous material, (4) a second sheet of the open-net spacer material, (5) a second sheet of the porous material, (6) third sheet of the open-net spacer material, and (7) a second sheet of the impervious backing material. The layered structure is sealed around the edges and wound into a component spiral. The space containing the first sheet of spacer material defines a gas-depletion channel. The space bounded by the two sheets of porous material and containing the second sheet of spacer material defines a permeation-transfer chamber. The space containing the third sheet of spacer material defines a gas-enrichment channel. Suitable inlet and outlet ports can readily be provided for communication with interior spaces of the spiral-wound structure. It is recognized that these and other changes may be made in the processes and appraratus specifically described herein without departing from the scope and teaching of the instant invention. It is intended to encompass all other embodiments, alternative and modifications consistent with the present invention.

I claim:

1. A process for separating a permeant gas from a feed-gas mixture, the feed-gas mixture comprising the permeant gas and at least one other gaseous component, the process comprising the steps of:
    (a) introducing a selective-permeation liquid into a permeation-transfer chamber, the selective-permeation liquid being selectively permeable to the permeant gas relative to the other component of the feed-gas mixture, a gas-depletion channel extending through the permeation-transfer chamber, the gas-depletion channel being separated from the permeation-transfer chamber by a gas-depletion porous wall, a gas-enrichment channel extending through the permeation-transfer chamber disjoint from the gas-depletion channel, the gas-enrichment channel being separated from the permeation-transfer chamber by a gas-enrichment porous wall, the gas-depletion and gas enrichment porous walls being in close proximity to one another, the gas-enrichment channel and the gas-depletion channel together defining gas-transfer channels, regions adjacent to the porous walls of the gas-transfer channels and exterior of the channels within the permeation-transfer chamber constituting open passages to permit a substantially free liquid passage of the selective-permeation liquid so that surfaces of the porous walls of the gas-transfer channels are contacted by the selective-permeation liquid in the permeation-transfer chamber;
    (b) introducing a stream of the feed-gas mixture into the gas-depletion channel and allowing the feed-gas mixture to flow through the channel in the permeation-transfer chamber so that permeant gas in the feed gas mixture can pass through the pores of the walls of the gas-depletion channel into the selective permeation liquid in the permeation-transfer chamber and from the selective-permeation liquid through the pores of the walls of the gas-enrichment channel into the gas-enrichment channel;
    (c) maintaining a difference between the pressure of the selective-permeation liquid in the permeation-transfer chamber and the pressure of the gas in the gas-depletion channel at a value which substantially prevents the selective permeation liquid from flowing through the gas-depletion porous wall into the gas-depletion channel and substantially prevents gas in the gas-depletion channel from flowing through the gas-depletion porous wall into the permeation-transfer chamber;
    (d) maintaining a difference between the pressure of the selective permeation liquid in the permeation-transfer chamber and the pressure of the fluid in the gas-enrichment channel at a value which substantially prevents the selective-permeation liquid from flowing through the gas-enrichment porous wall into the gas-enrichment channel and substantially prevents fluid in the gas-enrichment channel from flowing through the gas-enrichment porous wall into the permeation-transfer chamber;
    (e) withdrawing permeant gas from the gas-enrichment channel; and
    (f) withdrawing a stream of gas depleted in the permeant gas from the gas-depletion channel.

2. The process according to claim 1 in which the gas-depletion channel comprises the lumina of a multiplicity of porous-wall hollow fibers which extend through the permeation-transfer chamber and the gas-enrichment channel comprises the lumina of a multiplicity of a porous-wall hollow fibers which extend through the permeation-transfer chamber.

3. A process for separating a permeant gas from a feed-gas mixture, the feed-gas mixture comprising the permeant gas and at least one other gaseous component, the process comprising the steps of:
    (a) introducing a selective-permeation liquid into a permeation-transfer chamber, the selective-permeation liquid being selectively permeable to the permeant gas relative to the other component of the feed-gas mixture, a first multiplicity of porous-wall hollow fibers extending through the permeation-transfer chamber to define gas-depletion hollow fibers, a second multiplicity of porous-wall hollow fibers extending through the permeation-transfer chamber to define gas-enrichement hollow fibers, the gas-depletion and the gas-enrichment hollow fibers commingling in close proximity to one another in the permeation-transfer chamber, the gas-enrichment hollow fibers and the gas-depletion hollow fibers together defining gas-transfer hollow fibers, radially-outer surfaces of the walls of the permeant-gas-transfer hollow fibers being contacted by the selective-permeation liquid in the permeation-transfer chamber, surfaces of the walls of the gas-transfer hollow fibers in the permeation-transfer chamber being composed of a material which tends not to be wetted by the selective-permeation liquid;

(b) introducing a stream of the feed-gas mixture into the lumina of the gas-depletion hollow fibers and allowing the feed-gas mixture to flow through the lumina in the permeation-transfer chamber so that the permeant gas in the feed gas mixture can pass through the pores of the walls of the gas-depletion hollow fibers into the selective permeation liquid in the permeation-transfer chamber and from the selective-permeation liquid through the pores of the walls of the gas-enrichment hollow fibers into the lumina of the fibers;

(c) withdrawing permeant gas from the lumina of the gas-enrichment hollow fibers; and (d) withdrawing a stream of gas depleted in the permeant gas from the lumina of the gas-depletion hollow fibers.

4. The process according to claim 3 further comprising the step of introducing a sweep fluid into the lumina of the gas-enrichment hollow fibers.

5. The process according to claim 4 in which the sweep fluid is a gas and the step of withdrawing permeant gas from the lumina of the gas-enrichment hollow fibers comprises withdrawing a stream of gas enriched in the permeant gas from the lumina of the gas enrichment hollow fibers.

6. The process according to claim 5 in which the stream of feed-gas mixture is introduced into the lumina of the gas-depletion hollow fibers at a location outside of the permeation-transfer chamber, the stream of sweep gas is introduced into the gas-enrichment hollow fibers at a location outside of the permeation-transfer chamber, the stream of gas enriched in the permeant gas is withdrawn from the lumina of the gas-enrichment hollow fibers at a location outside of the permeation-transfer chamber, and the stream of gas depleted in the permeant gas is withdrawn from the lumina of the gas-depletion hollow fibers at a location outside of the permeation-transfer chamber.

7. The process according to claim 3 in which the gas-transfer hollow fibers are made of a hydrophobic material and the selective-permeation liquid is an aqueous solution.

8. The process according to claim 7 in which the gas-transfer hollow fibers are made of porous polypropylene, porous polyethylene or porous polytetrafluoroethylene.

9. The process according to claim 7 in which the permeant-gas is carbon dioxide and the selective-permeation liquid is an aqueous solution of an alkali-metal carbonate.

10. The process according to claim 7 in which the permeant gas is selected from the group consisting of carbon dioxide and hydrogen sulfide and the selective-permeation liquid comprises an amine selected from the group consisting of monoethanolamine, diethanolamine and hindered amines.

11. The process according to claim 7 in which the permeant-gas is carbon dioxide or carbon monoxide and the selective-permeation liquid is an aqueous solution of cuprous chloride and an alkali-metal chloride.

12. The process according to claim 7 in which the permeant gas is sulfur dioxide and the selective-permeation liquid is an aqueous solution of a salt selected from the group consisting of an alkali metal bisulfate and an alkali metal sulfite.

13. The process according to claim 7 in which the permeant gas is selected from the group consisting of ethylene and propylene and the selective-permeation liquid is an aqueous solution of water-soluble silver salt.

14. The process according to claim 7 in which the permeant gas is sulfur dioxide and the selective-permeation liquid is selected from the group consisting of sulfolane and polyethylene glycol.

15. The process according to claim 7 in which the permeant gas is ethanol and the selective permeation liquid is a non-polar organic liquid having a boiling point substantially higher than the boiling point of ethanol.

16. The process according to claim 5 further comprising the step of maintaining the selective-permeation liquid in the permeation-transfer chamber at a pressure higher than the pressure of the gas in the gas-depletion fibers and higher than the pressure of the gas in the gas enrichment fibers.

17. The process according to claim 3 in which each gas-transfer fiber includes a first and a second radial layer, the first radial layer being composed of a porous hydrophilic material and the second radial layer being composed of a porous hydrophobic layer.

18. A gas-transfer unit for selectively transferring a permeant gas from a feed-gas mixture comprising the permeant gas and at least one other component to an output fluid, the gas-transfer unit comprising:

(a) a fluid-tight housing, an interior of the housing defining a gas-transfer chamber, the housing having a feed-gas input port, a depleted-gas output port, a sweep-fluid input port, an enriched-gas output port and a selective-permeation liquid inlet port, the five ports providing communication with the gas-transfer chamber;

(b) gas-depletion porous-wall means located within the gas-transfer chamber for forming at least a portion of a wall of a gas-depletion channel which passes through the gas-transfer chamber, the gas-depletion channel connecting the feed-gas input port to the depleted-gas output port;

(c) gas-enrichment porous-wall means located within the gas-transfer chamber for forming at least a portion of a wall of a gas-enrichment channel which passes through the gas-transfer chamber, the gas-enrichment channel connecting the sweep-fluid input port to the enriched-gas output port, the gas-enrichment channel being disjoint from the gas-depletion channel, a region within the gas-transfer chamber and outside of the gas-enrichment channel and the gas-depletion channel defining a selective-permeation chamber, the selective-permeation-liquid inlet port providing communication with the selective-permeation chamber, the selective-permeation chamber including open passages adjacent to the gas-depletion porous-wall means and the gas-enrichment porous-wall means to permit a substantially free liquid passage of a preselected selective-permeation liquid introduced into the selective-permeation chamber through the selective-permeation-liquid inlet port to contact the gas-depletion porous-wall means and the gas-enrichment porous-wall means, the gas-depletion porous-wall means and the gas-enrichment porous-wall means being made of a material which tends to prevent the selective-permeation liquid in the selective-permeation chamber from flowing into the gas-depletion channel and into the gas-enrichment channel, so that a selective-permeation liquid can be confined in the selective-permeation chamber to facilitate the selective transfer of the permeant gas from the gas-depletion channel to the gas-enrichment channel of the gas-transfer unit.

19. The gas-transfer unit according to claim 18 in which: the gas-depletion porous-wall means forms a multiplicity of gas-depletion hollow fibers, the lumina of the gas-depletion hollow fibers comprising the gas-depletion channel; the gas enrichment porous-wall means forms a multiplicity of gas-enrichment hollow fibers, the lumina of the gas-enrichment hollow fibers comprising the gas-enrichment channel.

* * * * *